United States Patent [19]

Waye et al.

[11] Patent Number: 5,669,065
[45] Date of Patent: Sep. 16, 1997

[54] COMPLETELY REDUNDANT COMMUNICATION SYSTEM UTILIZING RADIATING TRANSMISSION LINE

[75] Inventors: Patrick M.Y. Waye, Stouffville; Kenneth John Morrell, Sunderland, both of Canada

[73] Assignee: Mine Radio Systems Inc., Sunderland, Canada

[21] Appl. No.: 362,199

[22] Filed: Dec. 22, 1994

Related U.S. Application Data

[63] Continuation-in-part of Ser. No. 305,300, Sep. 15, 1994.

[51] Int. Cl.$^6$ .................................................. H04B 3/02
[52] U.S. Cl. ............................ 455/523; 455/14; 455/67.1; 333/237
[58] Field of Search .................... 455/3.1, 8, 9, 14, 455/55.1, 105, 5.1, 67.1, 67.5, 54.1, 15, 16; 333/237; 375/256; 370/16, 16.1

[56] References Cited

U.S. PATENT DOCUMENTS

| | | | |
|---|---|---|---|
| 4,012,662 | 3/1977 | Martin | 455/55.1 |
| 4,476,574 | 10/1984 | Struven | 455/14 |
| 4,593,154 | 6/1986 | Takeda | 370/16 |
| 4,866,732 | 9/1989 | Carey et al. | 455/55.1 |
| 5,187,803 | 2/1993 | Sohner et al. | 455/55.1 |
| 5,230,080 | 7/1993 | Fabre et al. | 455/55.1 |
| 5,278,989 | 1/1994 | Burke et al. | 455/55.1 |

FOREIGN PATENT DOCUMENTS

| | | |
|---|---|---|
| 989013 | 5/1976 | Canada . |
| 1248223 | 9/1971 | United Kingdom . |
| 1491468 | 11/1977 | United Kingdom . |
| 1497288 | 1/1978 | United Kingdom . |
| 2057817 | 4/1981 | United Kingdom . |
| 2057818 | 4/1981 | United Kingdom . |
| 2073552 | 10/1981 | United Kingdom . |

OTHER PUBLICATIONS

Morgan, Michael A., and Sohner, Harold K., "A Radio Communications System for the English Channel Tunnel", in IEEE Transactions and Communication Technology, 1989, pp. 368 to 374.

*Primary Examiner*—Chi H. Pham
*Attorney, Agent, or Firm*—Riches, McKenzie & Herbert

[57] ABSTRACT

A radio frequency communication system utilizing a radiating transmission line is disclosed. During normal operation, a mobile communication unit near the radiating transmission line can communicate with other mobile communication units near the transmission line as well as with the base station. The communication system is redundant in that if a portion of the communication system fails such that communication signals cannot be communicated through the fault the communication system will continue to operate and communication signals from any mobile communication units near the radiating transmission line will be transmitted and received from the base station. The communication system is particularly suited for use in underground mines in which event the base station can be located at the surface, and the mobile communication units are generally located in the mine shafts.

20 Claims, 7 Drawing Sheets

FIG. 1 / PRIOR ART 5,669,065

COMPLETELY REDUNDANT COMMUNICATION SYSTEM UTILIZING RADIATING TRANSMISSION LINE

RELATED APPLICATIONS

This is a continuation-in-part of application Ser. No. 08/305,300, entitled Communication System Utilizing Radiating Transmission Line and filed on Sep. 15, 1994.

FIELD OF THE INVENTION

This invention relates to radio frequency communication systems and in particular radio frequency communication systems utilizing radiating or "leaky" transmission lines. In a particular embodiment, the present invention relates to radio frequency communication systems used for underground communication.

BRIEF DESCRIPTION OF THE DRAWINGS

In the drawings, which illustrate embodiments of the invention.

BACKGROUND OF THE INVENTION

Radiating transmission lines are deliberately constructed as imperfect transmission lines so that signals in the inner conductor radiate electromagnetic fields outwardly from the line as the electrical signals are being transmitted down the line. The electrical magnetic fields radiated from the line can be picked up by mobile receivers located remotely, but in the vicinity, of the line.

Radiating transmission lines can take on several different forms. One form comprises an open braid coaxial cable. Other forms comprise coaxial cables having cylindrical outer sheaths with longitudinal slits to permit radiation.

Radiating transmission lines are commonly used in environments where electromagnetic waves, such as radio frequency waves, do not propagate well. This type of environment exists in underground mine shafts. For example, a worker in a mine shaft using a remote mobile communication unit, such as a mobile radio or walkie-talkie, can not communicate to other workers who also have remote mobile communication units because the radio waves cannot propagate long distances down a mine shaft. However, if all of the workers are near a radiating transmission line such that the radio waves from the first worker's remote mobile communication unit could be received by the transmission line, those signals could be transmitted by the radiating transmission line and radiated near the remote mobile communication units of other workers. In this way, communication in the mine shaft can be effected.

In the past, several different types of communication systems utilizing radiating transmission lines have been used. However, a common difficulty with all of the prior art communication systems has been that a fault in the radiating transmission line effectively prevents communication to the portion of the mine past the fault. For example, if a fault arose at a point in the communication system such that a communication signal could not travel on the transmission line, either into or out of the mine, then persons located past the fault and going deeper into the mine could not communicate with others.

Such a fault could arise in the radiating transmission line itself, for example, if the radiating transmission line was cut or developed a short circuit. A fault could also arise in the electronic circuitry of one of the electronic units, such as an amplification unit or a branch unit. A malfunction in one of the mobile radios would not be considered a fault in the system because only the mobile radio affected would cease to operate and the other elements of the system would continue operating as before.

Figure 1:
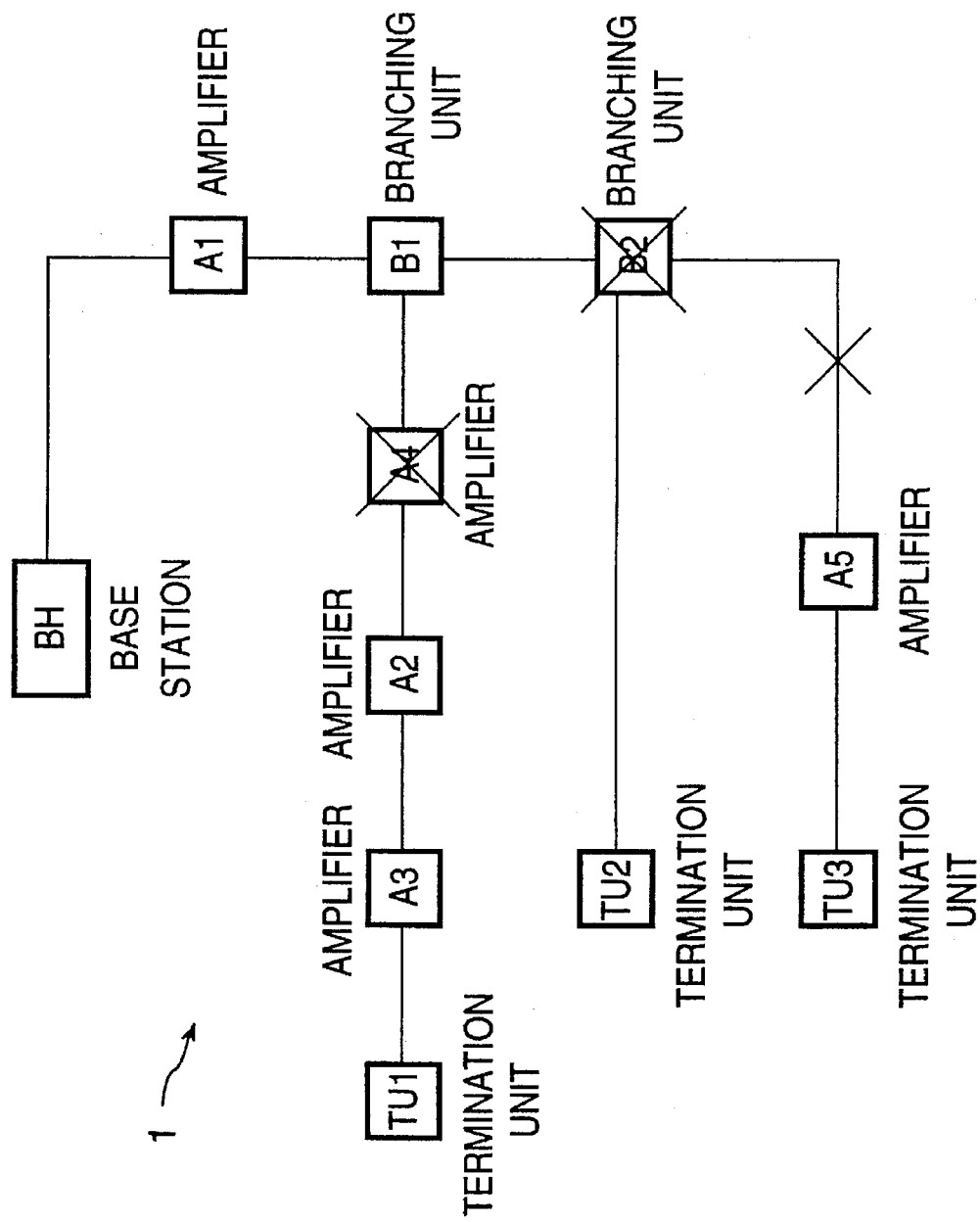
FIG. 1 is a diagram showing a prior art communication system.

FIG. 1 shows a diagram of a conventional communication system 1 used in a mine. FIG. 1 shows potential faults occurring at amplifier A4, branching unit B2, or on the radiating transmission line between branching unit B2 and amplifier A5. If any one of these three faults would occur in the prior art communication system, the mobile communication units located past the fault and going deeper into the mine would not be able to communicate with the base station BH or with other mobile communication units located anywhere in the mine.

For example, if amplifier A4 failed, communication signals could not be sent to or received from the radiating transmission line extending from amplifier A4 to termination unit TU1. Likewise, if branching unit B2 failed, communication signals could not be sent to or received from the radiating transmission line extending from branching unit B2 to termination unit TU2 and from branching unit B2 to termination unit TU3. If the radiating transmission line shorted, for example if it was cut or short circuited between branching unit B2 and amplifier A5 as indicated by the capital "X", then communication signals could not be sent to or received from the radiating transmission lines extending from the location of the fault to termination unit TU3.

In general, a communication system will occasionally fail for various reasons, such as from the harsh environment of underground mines which adversely affect electrical equipment. More importantly, if there is a disruption in the mine, such as a cave-in or an explosion, such a disruption could also cause a fault in the communication system thereby isolating the workers which are past the fault and the disruption. It is apparent that these are precisely the type of circumstances where a communication system could be most valuable in order to communicate with persons past a disruption in the mine.

Accordingly, there is a need in the industry for a communication system which can continue operating even in the event of a fault in the system, regardless of the location of the fault and regardless of the cause of the fault.

SUMMARY OF THE INVENTION

Accordingly, it is an object of this invention to at least partially overcome the disadvantages of the prior art. Also, it is an object of this invention to provide an alternative type of radiating line communication system which can continue normal operation even in the event of a fault at a point on the communication system, that being on the radiating transmission line itself or in one of the electronic components, such as an amplification unit, of the communication line.

Accordingly, in one of its aspects, this invention resides in providing a radio frequency communication system for communicating signals from and to remote mobile communication units comprising: a radiating transmission line having a first end and a second end; a first remote mobile communication unit comprising mobile receiver means for receiving a first communication signal from the transmission line at a first frequency and mobile transmitter means for transmitting a second communication signal to the transmission line at a second frequency; a base station coupled to the first end and the second end of the radiating transmission line, said base station comprising: base transmitter means for transmitting the first communication signal at the first frequency into the first end or into the second end of the transmission line; and base receiver means for receiving the second communication signal at the second frequency from the first end or the second end of the transmission line; and wherein the second communication signal transmitted by the first mobile communication unit can be received by the base receiver through the first end or the second end of the transmission line.

Further aspects of the invention reside in providing a radio frequency communication system for communicating signals from and to remote mobile communication units comprising: a radiating transmission line having a first end and a second end; a first remote mobile communication unit comprising mobile receiver means for receiving a .first communication signal from the transmission line at a first frequency and mobile transmitter means for transmitting a second communication signal to the transmission line at a second frequency; a base station Coupled to the first end and the second end of the radiating transmission line, said base station comprising: base transmitter means for transmitting the first communication signal at the first frequency into the first end or into the second end of the transmission line; and base receiver means for receiving the second communication signal at the second frequency from the first end or the second end of the transmission line; and wherein when there is no fault in the system and the first remote mobile communication unit is near the radiating transmission line, the first communication signal and the second communication signal can take at least two separate paths on the transmission line from the base station to the first communication unit.

Still further aspects of the invention reside in providing a radio frequency communication system for communicating signals from and to remote mobile communication units comprising: a radiating transmission line having a first end and a second end; a first mobile communication unit comprising mobile receiver means for receiving a first communication signal from the transmission line at a first frequency and mobile transmitter means for transmitting a second communication signal to the transmission line at a second frequency; a base station coupled to the first end of the radiating transmission line comprising: base transmitter means for transmitting the first communication signal at the first frequency into the first end; and base receiver means for receiving the second communication signal at the second frequency from the first end; a first branching means located at a branching location on the radiating transmission line for electrically coupling the second end of the radiating transmission line to the radiating transmission line at the branching location such that the first and second communication signals may pass from the radiating transmission line into the second end of the transmission line; wherein the second end of the radiating transmission line is electrically coupled to the radiating transmission line at the branching location if, and only if, there is a fault in the system between the branching location and the second end of the transmission line.

Further aspects of the invention will become apparent upon reading the following detailed description and the drawings which illustrate the invention and preferred embodiments of the invention.

DETAILED DESCRIPTION OF PREFERRED EMBODIMENTS OF THE INVENTION

Figure 2:
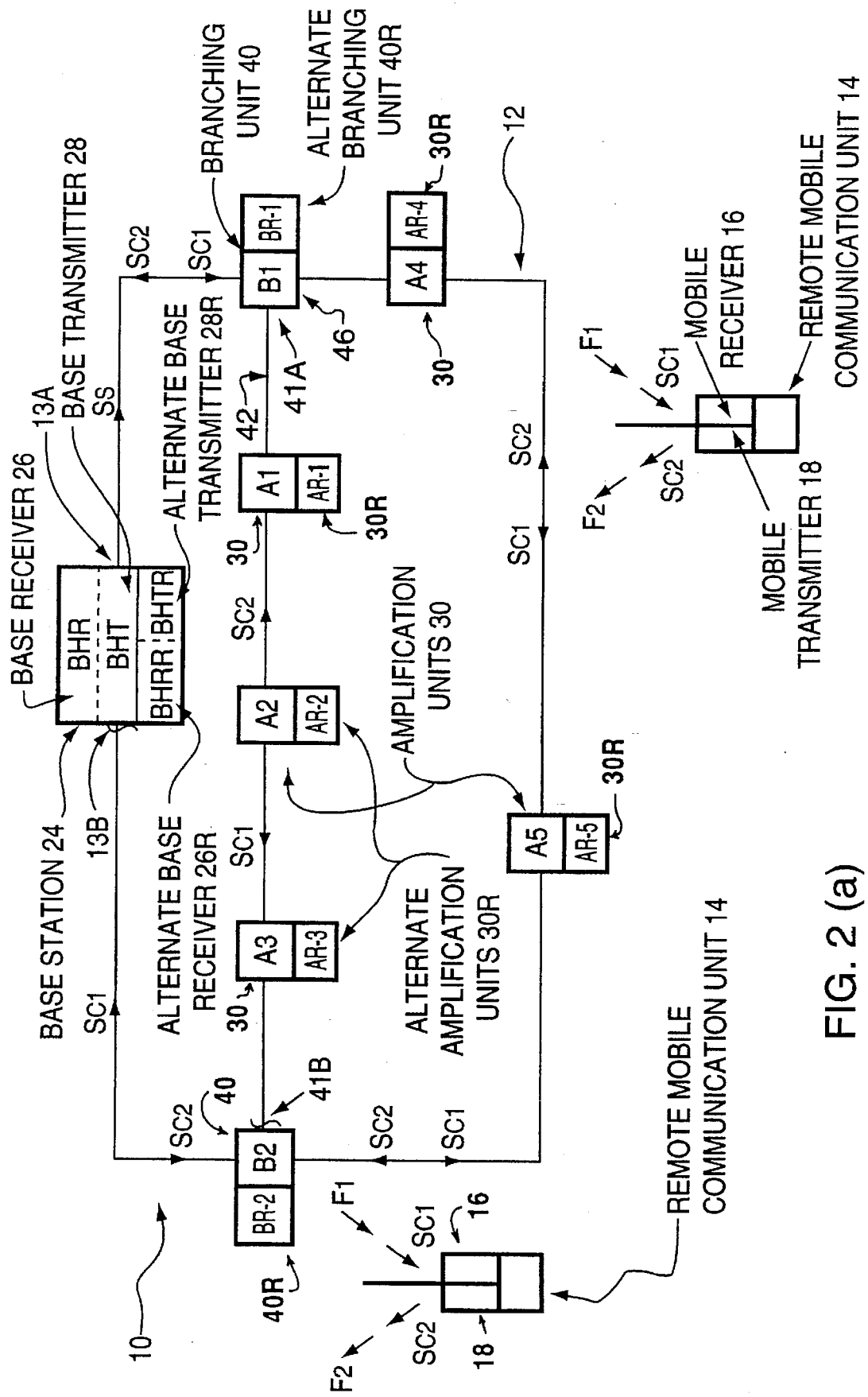
FIG. 2(a) is a diagram showing one embodiment of the a communication system according to the present invention.
FIG. 2(b) is a diagram showing the embodiment of the invention shown in FIG. 2(a) with a fault at the branching unit B1.
FIG. 2(c) is a diagram showing the embodiment of the invention shown in FIG. 2(a) with a fault on the transmission line between amplification units A4 and A5.
FIG. 2(d) is a diagram showing the embodiment of the invention shown in FIG. 2(a) with a fault on the transmission line between amplification units A4 and A5.
FIG. 2(e) is a diagram showing the embodiment of the invention shown in FIG. 2(a) with a fault at amplification unit A2.

As shown in FIG. 2(a), one embodiment of the present invention comprises a radio frequency communication system, shown generally as 10. The communication system 10 comprises a radiating transmission line 12 used for transmitting and radiating communication signal Sc to and from the remote mobile communication units 14 and the base station 24. It is understood that several such remote mobile communication units 14 can be located near the radiating transmission line 12 and several communication signals Sc may be sent and received from the radiating transmission line 12.

For the purposes of the present description, it shall be .assumed that the radio frequency communication system 10 is installed in an underground mine such that a substantial part of the radiating transmission line 12 is located below ground. For example, it will be assumed that the vertical extension of the radiating transmission line 12 goes down a mine shaft and that each horizontal extension of the line 12 goes down a different level of the mine. However, it is understood that the system 10 could be used in any environment where radio waves do not propagate well.

The radiating transmission line 12 is of the type as discussed above wherein electromagnetic signals are both transmitted by and radiated from the transmission line 12. In this way, the remote mobile communication units 14 can transmit and/or receive radio frequency electromagnetic transmissions to and/or from the radiating transmission line 12.

The base station 24 comprises a base receiver 26 and a base transmitter 28. The base station 24 is electrically coupled to the first end 13A and second end 13B of the transmission line 12 such that the base receiver 26 can receive communication signals Sc at a frequency from the first end 13A or the second end 13B of the transmission line 12. Likewise, the base transmitter 28 can transmit communication signals Sc at a frequency into the first end 13A or the second end 13B of the transmission line 12. Therefore, in the embodiment where the base station 24 is located at the surface of mine, communication signals Sc can be sent into and received from persons in the mine through either the first end 13A or the second end 13B.

While the communication system 10 is capable of transmitting and radiating several communication signals Sc at different frequencies, for the purposes of this specification, the communication signals shall be grouped as the first communication signals $Sc_1$, representing the electromagnetic signals transmitted by the base transmitter 28 into the mine, and the second communication signals $Sc_2$, representing the electromagnetic signals transmitted by communication units 14 and received by the base receiver 26. The first communication signals $Sc_1$ shall be considered as being at a first frequency F1 and the second communication signals $Sc_2$ shall be considered as being at the second frequency F2. Frequencies F1 and F2 are radio frequencies capable of being transmitted and radiated by the radiating transmission line 12.

It is understood that the base station 24 can be directly coupled to the first end 13A and the second end 13B of the line 12 or can be indirectly coupled to the line 12 by means of a header unit (not shown). A header unit (not shown) generally receives the transmission line 12 and separates the various communication signals, such as the first communication signal $Sc_1$ and the second communication signal $Sc_2$ and is particularly useful when several signals are transmitted on the line 12.

The remote mobile communication units 14 can be any type of device which transmits and/or receives electromagnetic signals. Such devices include mobile radios including walkie-talkies and portable video cameras having a built in transmitter for transmitting video information such as sensed images. Such devices could also include mobile data units for transmitting and/or receiving binary computer information, in either binary or analog data points, similar to the way a modem would transmit computer data over phone lines. Accordingly, the communication units could be used to transmit and/or receive video information, audio information or computer data. Likewise, the first and second communication signals $Sc_1$ and $Sc_2$ could relate to any type of information such as video information, audio information or computer data.

The communication units 14 shown in FIG. 2(a) are mobile radios. Each communication unit 14, as shown in FIG. 2(a) comprises a mobile receiver 16 for receiving the first communication signal $Sc_1$ at a first frequency F1 and a mobile transmitter 18 for transmitting a second communication signal $Sc_2$ to the transmission line 12 at a second frequency F2.

The second communication signal $Sc_2$ can be received by the base receiver 26 and retransmitted by the base transmitter 28 at the first frequency F1. This allows the second communication signals $Sc_2$, which are transmitted by remote units 14 to the base receiver 26, to be retransmitted by the base transmitter 28 at the first frequency F1 and received by the mobile receivers 16 of all other remote mobile units 14. In this way, one mobile communication unit 14 car communicate to all other mobile communication units 14.

As shown from FIG. 2(a), during normal operation of the system 10, namely when there is no fault in the system, the second communication signal $Sc_2$ transmitted by the communication units 14 can be received by the base receiver 26 through the first end 13A or the second end 13B of the radiating transmission line 12 because the transmission line 12 loops from the first end 13A to the second end 13B. Although it is capable of receiving the second communication signal $Sc_2$ through the first end 13A or the second end 13B of the transmission line 12, during the normal operation of the system 10, the base receiver 26 will only receive a second communication signal $Sc_2$ through either the first end 13A or the second end 13B, but not both.

This is accomplished by configuring the system 10 to permit the first communication signal $Sc_1$ to be sent from one end, 13A or 13B, and likewise the second communication signal $Sc_2$ will only be received by the same end, 13A or 13B, but not both. In other words, the second communication signal $Sc_2$ has at least two potential and completely separate paths it may take to the base station 24 from the communication units 14 but it will be configured to only take one path.

Likewise, during normal operation of the system 10, namely when the communication system 10 is operating properly and there is no fault, the base transmitter 28 can transmit the first communication signal $Sc_1$ into either the first end 13A or the second end 13B of the transmission line 12, but not both. It is apparent that whether the base transmitter 28 transmits the first communication signal $Sc_1$ into the first end 13A or the second end 13B of the transmission line 12, the mobile communication unit 14 will receive the first communication signal $Sc_1$ because the transmission line 12 is electrically continuous and loops around from the first end 13A to the second end 13B. In other words, the first communication signal $Sc_1$ has at least two potential and completely separate paths it may take to the communication units 14 from the base station 24. Therefore, the transmission line 12 is redundant in that a single fault on the transmission line, namely a location on the line 12 through which either the first or second communication signals $Sc_1$ or $Sc_2$ cannot be transmitted, at any location on the line 12 will not affect transmission of the first and second communication $Sc_1$ and $Sc_2$ to any mobile unit near any part of the transmission line 12.

It is also shown in FIG. 2(a), the system 10 comprises a plurality of amplification units 30 individually labelled as A1 through to A5. The amplification units amplify the first and second communication signals $Sc_1$, $Sc_2$. The amplification units 30 are connected to the transmission line 12 in order to amplify the communication signals Sc. The amplification Units are connected to the transmission line 12 at sufficient locations to ensure that the communication signal Sc are of sufficient strength. The amplification units 30 are generally connected to the transmission line 12 at periodic locations such as every 350 meters. However, amplification units 30 may be required more frequently if other elements, such as branching units 40, interrupt the line 12 thereby increasing the signal loss.

The amplification units 30 amplify the first communication signal in a direction and amplify the second communication signal Sc in the opposite direction to the first communication signal $Sc_1$ because the communication signals $Sc_1$ and $Sc_2$ are travelling in opposite directions. As stated above, the first communication signal $Sc_1$ represents the electro-magnetic signals travelling from the base station 24 down into the mine and which are to be radiated near the communication units 14, while the second communication signal $Sc_2$ are transmitted by the communication units 14 on to the radiating transmission line 12 and to the base station 24. By amplifying the signals in opposite directions, the amplification units 30 promote the transmission of the communication signals $Sc_1$ and $Sc_2$ in the proper direction. In general, the amplification units 30 will amplify the first communication signal $Sc_1$ to a higher level than the second communication signal $Sc_2$ because the first communication signal $Sc_1$ must have sufficient amplitude to be radiated by the transmission 12 and received by the communication units 14.

FIG. 2(a) shows the communication system 10 during normal operation. As stated above, normal operation of the system 10 occurs when there is no fault in the system 10 through which either the first communication signal $Sc_1$ or the second transmission signal $Sc_2$ cannot be transmitted. As also stated above, in this situation, while the first and second communication signals $Sc_1$ and $Sc_2$ can be received from and transmitted to the first end 13A or the second end 13B, they will only be transmitted and received from one end, 13A or 13B. In FIG. 2(a), the first end 13A has arbitrarily been selected as the end from which the first communication signal $Sc_1$ will be transmitted and the second communication signal $Sc_2$ will be received.

As shown in FIG. 2(a), the base station 24 has been configured to treat the second end 13B as a temporary termination so that no communication signal is transmitted or received from the second end 13B. This is shown in FIG. 2(a) by the elongated "S". Preferably, the base station 24 comprises impedance-matching circuitry to create a temporary termination to the second end 13B with a minimum amount of reflected signal.

The base station 24 has been configured such that the base transmitter 28 transmits the first communication signal $Sc_1$ to the first end 13A of the transmission line 12 and the base receiver 26 receives the second communication signal $Sc_2$ from the first end 13A of the communication line 12. The amplification units 30 in FIG. 2(a) have been configured to amplify the second communication signal $Sc_2$ towards the first end 13A of the radiating transmission line 12 and to amplify the first communication signal $Sc_1$ in a direction away from the first end 13A of the radiating transmission line 12 running into the mine.

It is also shown in FIG. 2(a) system 10 comprises a branching unit 40 connected to the radiating transmission line 12. The branching means 40 electrically couples the first end 41A of a branching radiating transmission line 42 to the transmission line 12 at branching location 16 such that the first and second communication signals $Sc_1$ and $Sc_2$ may pass from the radiating transmission line 12 to the branching transmission line 42 and still be transmitted along the remainder of the transmission line 12 past the branching unit 40. The branching radiating transmission line 42 also has amplification units 30 shown as amplification units A1, A2 and A3.

The branching radiating transmission line 42 may be connected to the transmission line 12 in a manner as known in the prior art and may have a termination unit at the second end 41B away from the branching unit 40 as shown in FIG. 1. In this case, the branching radiating transmission line 42 would not be redundant in that a fault along the branching radiating transmission line 42 would prevent communication signals Sc from being transmitted past the fault and deeper into the mine.

To make the branching transmission line 42 redundant such that a fault along the branching radiating transmission line 42 would not cause communication units 14 located near the branching transmission line 42 from being cut off from the system 10, the second end 41B of the branching radiating transmission line 42 is mechanically coupled to a second branching unit 40 shown in FIG. 2(a) as B2. During normal operating conditions when there is no fault in the system 10, either the first end 41A or the second end 41B of the branching radiating transmission line 42 is electrically coupled to the transmission line 12. In other words, there is no more than one continuous electrical connection from the first end 13A to the second end 13B of the transmission line 12. In other words, referring to FIG. 2(a), the first end 41A of the branching transmission line 42 is shown electrically coupled by the branching unit 40 to the transmission line 12. However, the second end 41B of the branching line 42 is shown terminated by the branching unit B2 by the long "S" similar to the second end 13B.

It is necessary to terminate one end of the branching line 42 to ensure proper communication of the first and second signals $Sc_1$ and $Sc_2$. If both the first end 41A and second end 41B were electrically coupled to the branching unit 40 during normal operation of the system 10, the first and second communication signals $Sc_1$ and $Sc_2$ could take two different paths to the same ultimate location namely the first end 13A of the transmission line 12, and the communication signals $Sc_1$ and $Sc_2$ taking the two separate paths, would overlap and cause interference when reunited at branching unit 40. Accordingly, terminating the second end 41B of the branching line 42 so that there is no more than one continuous electrical connection from the first end 13A to the second end 13B of the transmission line 12 ensures proper formation of the system 10 during normal operating conditions.

As stated above, a fault in the system 10 occurs when either the first communication signal $Sc_1$ or the second communication signal $Sc_2$ cannot pass through a portion of the system 10. Such a system fault could result from a fault in the transmission line 12 or branching line 42 caused by an open circuit (the line 12 or 42 being cut) or a short circuit in the transmission 12 or branching line 42 (an accidental connection to ground). In addition, a fault arises in the system when one of the electronic components, such as the amplification units 30 or the branching units 40 fail thereby preventing transmission of the communication signals $Sc_1$ and $Sc_2$.

In order to further guard against a fault in the system, in a preferred embodiment each of the electronic components, such as the amplification units 30 and branching units 40, have alternative electronic modules or units associated with them. For example, each amplification unit 30 and branching unit 40 is associated with an alternative amplification means 30 or branching means 40, respectively, for performing the function of the associated unit. In other words, associated with each amplification unit 30 is an alternative amplification unit 30R shown in FIG. 2(a) as AR-1 through to AR-5 for amplifying the first and second communication signals $Sc_1$ and $Sc_2$ when the amplification unit 30 with which the alternative amplification means 30R is associated, namely amplification units 30 shown as A1 through to A5, fail. Likewise, associated with each branching unit 40 is an alternative branching unit 40R for electrically coupling the branching radiating transmission line 42 to the radiating transmission line 12 when the branching unit 40 with which the alternative branching unit 40R is associated fails. In this preferred embodiment, the alternative electronic components provides an additional guard against system failure.

In addition, the base station 24 comprises an alternative base transmitter 28R for transmitting the first communication signal $Sc_1$ at the first frequency F1 into the first end 13A or the second end 13B of the transmission line 12 when the base transmitter 28 fails. Likewise, the base station 24 comprises an alternative base receiver 26R for receiving the second communication signal $Sc_2$ at the second frequency F2 from the first end 13A or the second end 13B of the transmission line 12 when the base receiver 26 fails.

Figure 2B:
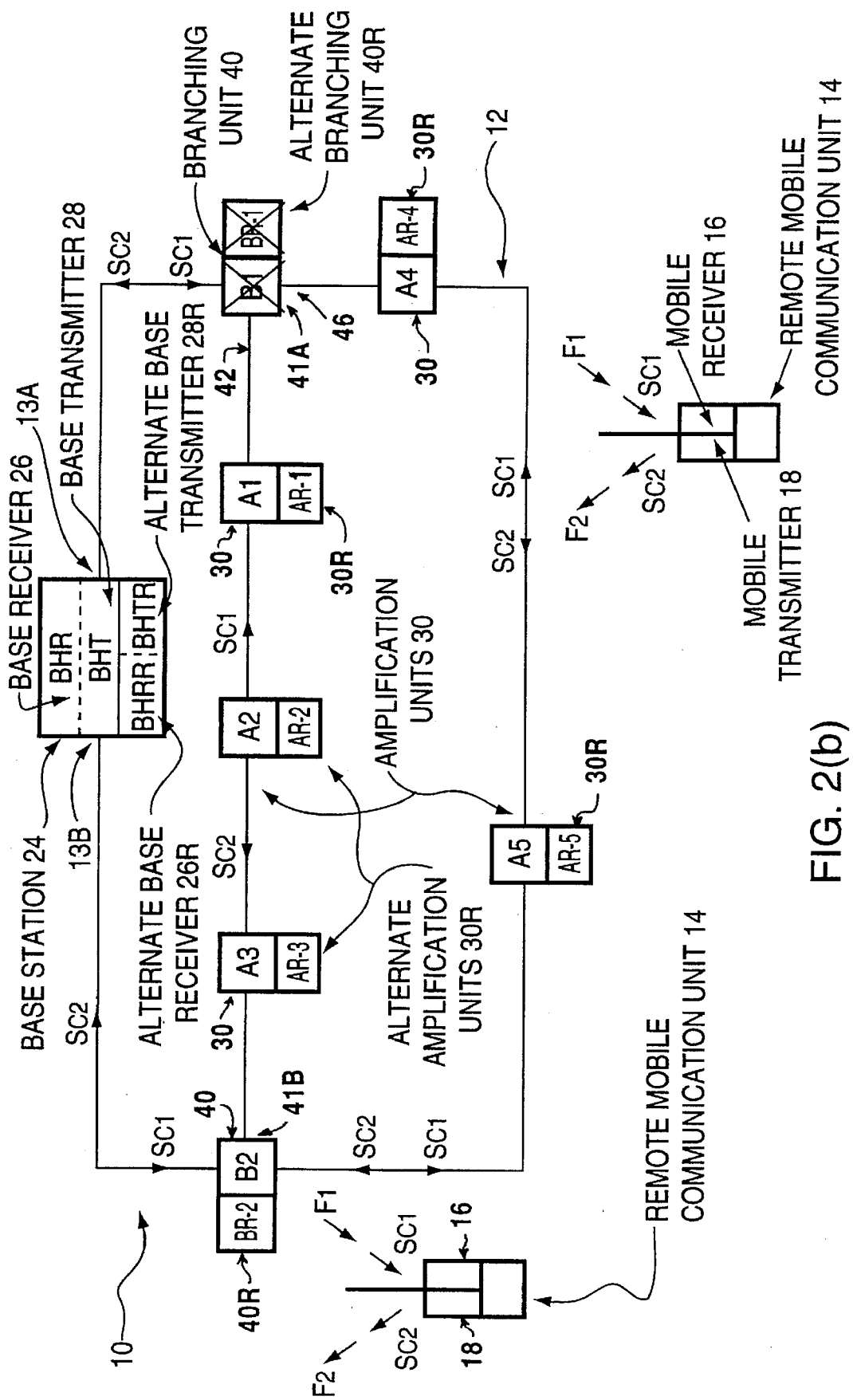
Figure 2:
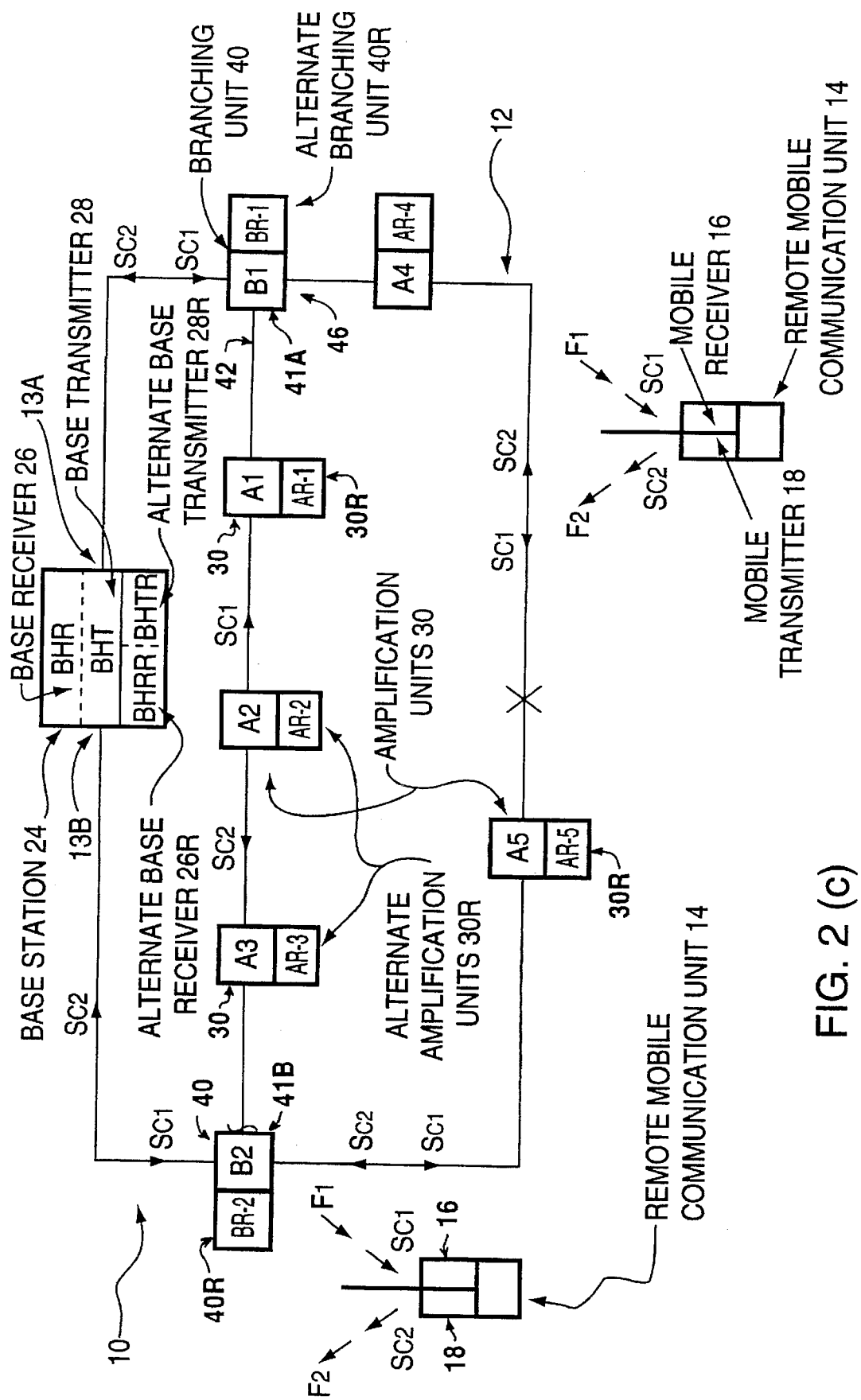
Figure 2:
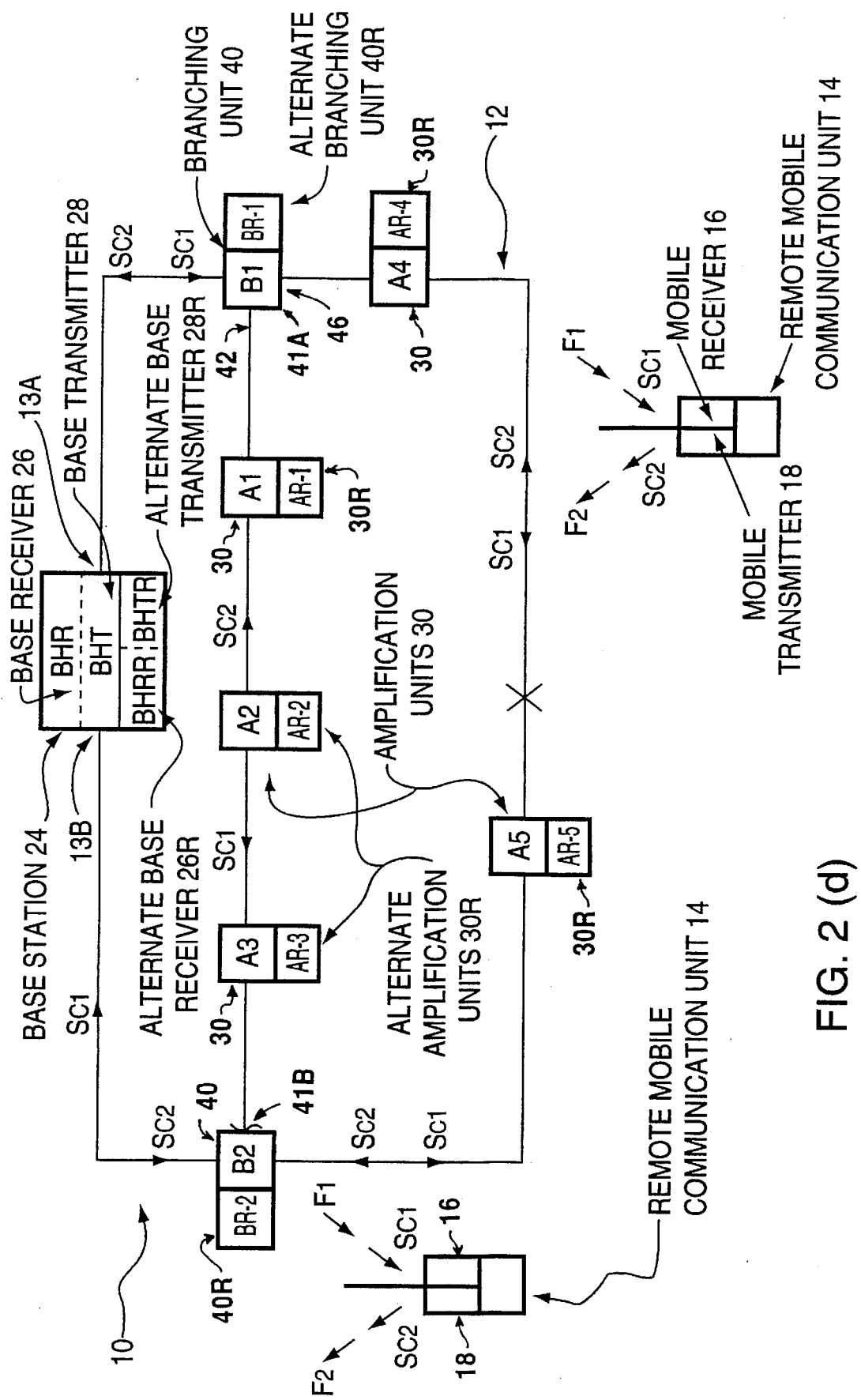

FIG. 2(b) shows the embodiment of the invention shown in FIG. 2(a) but, the branching unit 40 and the alternative branching 40 have both failed. In this case, the communication signals $Sc_1$ and $Sc_2$ cannot pass through the branching unit 40. In this case, the fault has prevented communication of the first communication signal $Sc_1$ from the first end 13(a) to the second end 13(b) of the transmission line 12 either through the transmission line 12 or the branching transmission line 42. Such a fault in the system 10 could have resulted from several possible events such as a cave in or explosion near the location of the branching unit 40.

To overcome the fault and restore normal operation to the system 10, the base transmitter 28 commences transmitting the first communication $Sc_1$ to the first end 13A and to the second end 13B of the transmission line 12 and the base receiver 26 commences receiving the second communication signal $Sc_2$ from the first end 13A and the second end 13B of the radiating transmission line 12. At the same time, a second branching means 40 shown as B2 in FIG. 2(b), is configured to redirect the second communication signal $Sc_2$ in a direction away from the fault, in this case located at B1. In general, the amplification units 30 located between the fault and this first end 13A of the transmission line 12 will amplify the second communication signal $Sc_2$ towards the first end 13A of the radiating transmission line 12 and away from the fault and amplify the first communication signal $Sc_1$ away from the first end 13A of the radiating transmission line 12 and towards the fault. Similarly, all of the amplification units 30 located between the fault and the second end 13B of the transmission line 12 will amplify the second communication signals $Sc_2$ towards the second end 13B and away from the fault and will amplify the first communication signal $Sc_1$ away from the second end 13B and towards the fault. As shown in FIG. 2(b), the failure of branching unit 40 has not interrupted communication to any part of the system 10. The amplification units 30, branching units 40 and the base transmitter 28 and base receiver 26 can be reconfigured to amplify, redirect, transmit or receive the signals as discussed above either physically, by having a person physically reconfigure these elements, or remote by sending a control signal from the base station 24.

FIG. 2(c) shows a fault occurring or having occurred on the radiated transmission line 12 between amplification units A4 and A5. This type of fault could result from a short circuit or an open circuit on a transmission line 12. As shown in FIG. 2(c), the base transmitter 28 is transmitting the first communication signal $Sc_1$ to the first end 13A and the second end 13B of the transmission line 12 and the base receiver 26 is receiving the second communication signal $Sc_2$ from the first end 13A and the second end 13B of the radiating transmission line 12. Amplification unit A5 will transmit the second communication signal $Sc_2$ away from the fault and towards the second end 13B while transmitting the first communication signal $Sc_1$ away from the second end 13B and towards the fault. In a similar manner, amplification unit A4 will amplify the second communication signal $Sc_2$ away from the fault and towards the first end 13A while amplifying the first communication signal away from the first end 13A and towards the fault. Amplification units A1, A2, A3 and branching unit B1 will continue operating as before the fault. Branching unit B2 will still terminate the second end 41B of the branching line 42 but will now transmit the first and second communication signals in the opposite direction to that shown in FIG. 2(a).

FIG. 2(d) shows a system 10 with a fault in the same position on the radiating transmission line 12 as that shown in FIG. 2(c). In FIG. 2(d), base transmitter 28 and the base receiver 26 do not transmit or receive the first and second communication signals $Sc_1$ and $Sc_2$, respectively, through the second end 13B. Rather, the fault has been overcome by use of the branching line 42 by branching unit B2 eliminating the temporary termination at the second end 41B of the branching line 42 and transmitting the signals from the fault to the second end 13B along the branching line to the first end 13A.

In general, if a fault develops in the system 10 such that the first communication signal $Sc_1$ or the second communication signal $Sc_2$ cannot be transmitted through the fault, the normal operation can return by the base transmitter 28 commencing to transmit the first communication signal to the first end 13A and the second end 13B of the transmission line 12 and the base receiver 26 commencing to receive the second communication signal from the first end 13A and the second end 13B of the radiating transmission line 12. However, in the case where a branching line 42 exists in the system, many faults such as that shown in FIG. 2(c) and 2(d), may be overcome by use of the branching line 42 as shown in FIG. 2(d) and maintaining the temporary termination of the second end 13B. In other words, using the second end 13B of the radiating transmission line 12 will always overcome a failure in the system 10, but, some failures of the system 10 may be overcome without transmitting and receiving the communication signals $Sc_1$ and $Sc_2$ to the second end 13B. It is only if the fault prevents transmission of the communications signals $Sc_1$ and $Sc_2$ through the transmission line 12 or the branching transmission line 42, as was the case with the fault shown in FIG. 2(b), that the communication signal $Sc_1$ and $Sc_2$ must be transmitted through the second end 13B.

Figure 2E:
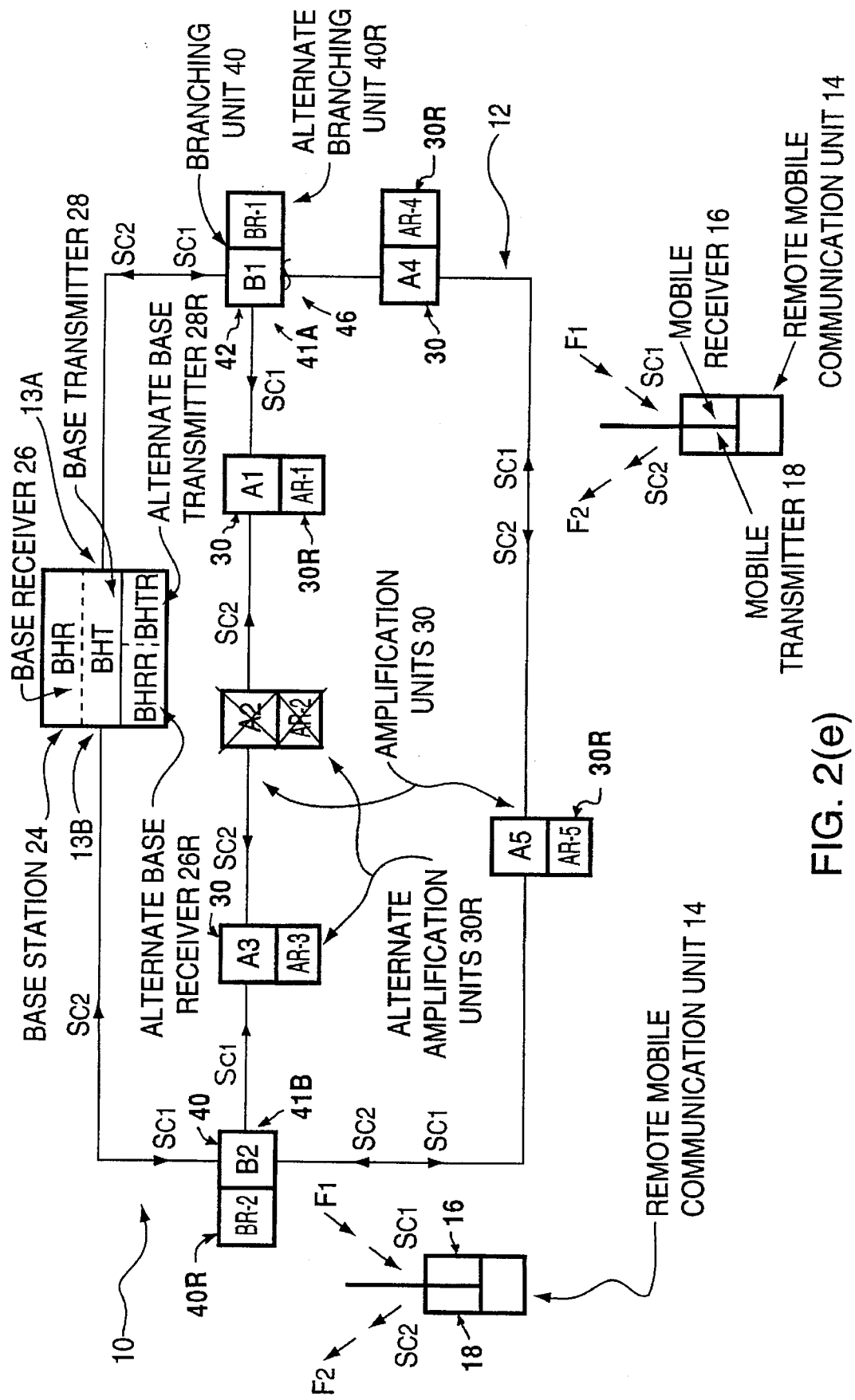

FIG. 2(e) shows a further example where a fault has occurred at amplification unit A2 and alternative amplification unit AR-2. In this case, communication signals $Sc_1$ and $Sc_2$ are transmitted and received from both the first end 13A and the second end 13B. Branching unit B1 has temporarily terminated transmission line 12 and the amplification units A4 and A5 amplify the second communication signal away from B1 towards the second end 13B. Amplification unit A3 amplifies a second communication signal $Sc_2$ away from the fault and towards the second end 13B.

As was the case with the fault shown in FIGS. 2(c) and 2(d), the fault shown in FIG. 2(e) could be overcome without using of the second end 13B of the transmission line 12 such as by using the branching line 42. By having more than one possible solution to overcome faults in the system 10, more than one fault could be overcome. For example, a system 10 having all of the faults shown in FIGS. 2(c), 2(d) and 2(e) could still maintain proper operation of the communication system 10. In general, multiple faults which each occur in parallel, such as on separate branches or in branches and in main transmission line 12, can be overcome and will not interfere with the system 10. It is only multiple faults which occur in series one after the other on the same branch or line which completely eliminate communication to the area between the series faults.

FIG. 2(a) also shows a system signal Ss emitted by the base transmitter 28 into the first end 13A or the second end 13(b) of the radiating transmission line 12. Generally, if the base transmitter 28 is transmitting the first communication signal $Sc_1$ into the first end 13A of the transmission line 12, the base transmitter 28 will also transmit the system signal Ss into the first end 13A. The system signal Ss is similar to the first communication signal $Sc_1$ in that it cannot be transmitted through a fault, whether the fault is in the transmission line 12 or in one of the electronic components. Accordingly, the system signal Ss can be transmitted continuously and can assist operators of the system 10 to locate and detect any faults in the system 10 and assist in reconfiguring the system 10 to overcome a fault. In a preferred embodiment, the system signal Ss is amplified by the alternate amplification units 30R" and electrically coupled to be radiating transmission line 12 by the alternate branching unit 40R.

It is apparent that the embodiment this invention shown in FIG. 2(a) is completely redundant in that a fault in the system 10 at any location, such as at any point on the transmission line 12 of the branching transmission line 42 or in any of the electronic components, could be completely overcome. However, in some embodiments where the entire system does not need to be completely redundant due to cost constraints or other reasons but a portion of the system 10 need by redundant, a communication system 110 as shown in FIG. 3 may be used.

Figure 3:
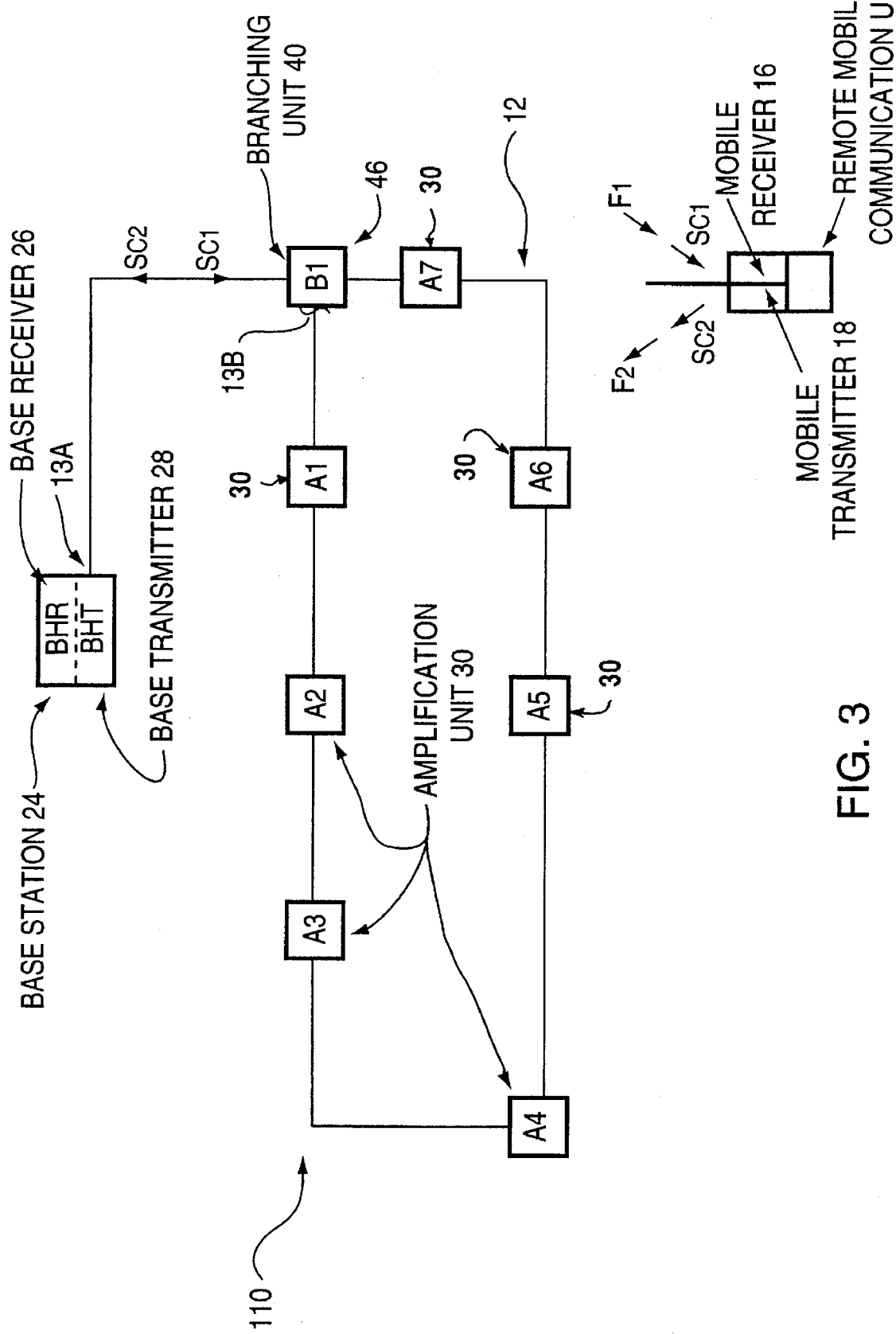
FIG. 3 is a diagram showing another embodiment of the communication system of the present invention.

In FIG. 3 the transmission line 12 has first end 13A and a second end 13B. However, unlike the system shown in FIG. 2(a), the base station 24 is electrically coupled only the first end 13A of the radiating transmission line 12. The base receiver 26 and the base transmitter 28 receives and sends communication signals Sc into the first end 13A of the branching of the transmission line 12 only. The embodiment shown in FIG. 3 further comprises a branching unit 40 located at branching location 46 on the transmission line 12. The second end 13B of the transmission line 12 extends from the branching unit 40 and may be electrically coupled to the radiating transmission line 12 at the branching location 46 such that the first and second communication signal $Sc_1$ and $Sc_2$ may pass from the radiating transmission line 12 into the second end 13B of the transmission line 12. It is apparent that the system 110 shown in FIG. 3 is similar to the system 10 shown in FIG. 2(a) except that the second end 13B of the transmission line 12 does not loop back to the base station 24 but rather loops back to branching unit 40 located at branching location 46 on the transmission line 12.

During normal operation of the system 110 the second end 13B of the transmission line 12 is not electrically coupled to the transmission line 12 at the branching location 46. Rather, the second end 13B of the radiating transmission line 12 is electrically coupled to the radiating transmission line 12 at the branching location 46 if, and only if, there is a fault in the system 110 between the branching location 46 and the second end 13B of the transmission line 12. The second end 13B is shown not to be electrically coupled to the transmission line 12 by the long "S" drawn on FIG. 3 at the second end 13B indicating a temporary termination at the second end 13B by the branching unit 40. When there is a fault in the transmission line 12 between the branching location 46 and the second end 13B of the transmission line 12, the branching unit 40 electrically couples the second end 13B to the transmission line 12 such that first communication signals $Sc_1$ can be transmitted to the fault through the branching location 46 through and into the second end 13B of the transmission line and into the fault.

Likewise, when there is a fault in the transmission line 12 between the branching location 46 and the second end 13B of the transmission line 12, the branching unit 40 electrically couples the second end 13B to the transmission line 12 such that the second communication signals $Sc_2$ through the branching location 46 for communication units 14 located near the transmission line 12 between the fault and the branching location 46, and the second communication signals $Sc_2$ for communication units 14 located near the transmission line 12 between the faults and the second end 13B of the transmission line 12 pass through the second end 13B of the transmission line 12 through the branching means 40 and into the radiating transmission line 12 at the branching location 46.

Accordingly, the system shown in FIG. 3 will be partially redundant in that any fault in the system 110 between the second end 13B and the branching location can be overcome. It is apparent that additional branching units 40 with branching transmission lines (not shown) can be attached to the transmission line 12 shown in FIG. 3 and be redundant provided they loop back to the transmission line 12 at two separate branching locations similar to the branching units 40 and the branching transmission line 42 shown in the embodiment in FIG. 2(a).

It is understood that the first end 13A and second end 13B of the transmission line 12 are not necessarily the physical ends of the line 12. Rather, the line 12 may be physically cut at several location to insert amplification units 30 or branching units 40. However, the transmission line 12, during normal operation of the system, is electrically continuous from the first end 13A to the second end 13B.

The present invention has been discussed in terms of only a first communication signal $Sc_1$ for transmitting information into the mine and a second communication signal $Sc_2$ for transmitting information from inside the mine to the surface. Nevertheless, it is apparent that the system 10 according to the present invention can support several communication signals Sc transmitted and received from the line 12 to several communication units 14 as well as several different types of communication units as is known in the art.

It is apparent that depending on the type of communication unit 14 being used, communication signals Sc could be transmitted and/or received. Even though the communication unit 14 has been discussed in terms both transmitting and receiving information, the present invention is considered to include communication units which only transmit or only receive information.

It is apparent that the base station 24 can be located at any location in the system provided that the first and second ends 13A, 13B of the transmission line 12 can be coupled to it. However, in the embodiment where the communication system 10 is used in a mine, such that a substantial part of the line 12 is located below ground, it is preferable that the base station 24 is located above ground. By being above ground the base station 24 is more easily serviced, is less likely to be damaged permits a base radio (not shown) to be installed to provide communication from outside of the mine to within the mine. For example, the base radio (not shown) could comprise a microphone into which persons on the surface can speak into and these audio signals may be modulated and transmitted by the base transmitter 28 at the first frequency F1 down the line 12. In this way, persons located on the surface of the mine can communicate with persons located underground. In a further embodiment, the base station 24 can receive audio signals from other radios located on the surface, or be connected to telephone lines located on the surface, such that persons distant from the base station 24 can communicate with persons in the mine.

It is understood that while the invention has been discussed in terms of a radiating transmission line having a first end and a second end connected to the base station, the invention is not limited to this. In particular, more than two ends of a radiating transmission lines could be connected to the same base station to provide even more redundancy in the system. This could be done by branching another line from the radiating transmission line shown in FIG. 2(a) back to the surface thereby having three ends coupled to the base station. It is apparent that the number of ends of the radiating transmission line connected to the base station in this manner could be more than three. Also, another radiating transmission line, which does not branch from the radiating transmission line shown in FIG. 2(a), could be connected to the base station.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A radio frequency communication system for communicating signals from and to remote mobile communication units comprising:

a radiating transmission line having a first end and a second end;

a first remote mobile communication unit comprising mobile receiver means for receiving a first communication signal from the transmission line at a first frequency and mobile transmitter means for transmitting a second communication signal to the transmission line at a second frequency;

a base station coupled to the first end and the second end of the radiating transmission line, said base station comprising:

base transmitter means for transmitting the first communication signal at the first frequency into the first end or into the second end of the transmission line; and base receiver means for receiving the second communication signal at the second frequency from the first end or the second end of the transmission line; and wherein if a fault develops in the system such that either the first communication signal or the second communication signal cannot be transmitted through the fault, the base transmitter means commences transmitting the first communication signal to the first end and the second end of the transmission line and the base receiver means commences receiving the second communication signal from the first end and the second end of the radiating transmission line.

2. A radio frequency communication system as defined in claim 1 wherein during normal operation the first communication signal is received by the first mobile communication unit whether the first communication signal is transmitted through the first end or the second end of the radiating transmission line and the second communication signal transmitted by the first mobile communication unit can be received by the base receiver through the first end or the second end of the transmission line.

3. A radio frequency communication system as defined in claim 1 further comprising a plurality of amplification means for amplifying the first and second communication signals wherein each such amplification means is connected to said transmission line at locations;

wherein during normal operation the base transmitter means transmits the first communication signal to the first end of the transmission line and the base receiver means receives the second communication signal from the first end of the communication transmission line and all of the amplification means amplify the second communication signals towards the first end of the radiating transmission line and amplify the first communication signals away from the first end of the radiating transmission line.

4. A radio frequency communication system as defined in claim 3 wherein if a fault develops in the communication system such that either the first communication signal or the second communication signal cannot be transmitted through the fault, the base transmitter means transmits the first communication signal to the first end and the second end of the transmission line and the base receiver means receives the second communication signal from the first end and the second end of the radiating transmission line;

wherein all of the amplification means located between the fault and the first end of the transmission line amplify the second communication signals towards the first end of the radiating transmission line and amplify the first communication signals away from the first end of the radiating transmission line; and wherein all of the amplification means located between the fault and the second end of the transmission line amplify the second communication signals towards the second end of the radiating transmission line and amplify the first communication signals away from the second end of the radiating transmission line.

5. A radio frequency communication system as defined in claim 3 further comprising a branching radiating transmission line having a first end and a second end;

a first branching means for electrically coupling the first end of the branching radiating transmission line to the radiating transmission line such that the first and second communication signals may pass from the radiating transmission line to the branching transmission line, said first branching means being connected to the radiating transmission line at a first branching location;

a second branching means for electrically coupling the second end of the branching radiating transmission line to the radiating transmission line such that the first and second communication signals may pass from the radiating transmission line to the branching transmission line, said second branching means connected to the radiating transmission line at a second branching location separated from the first branching location;

wherein the branching radiating transmission line is electrically coupled to the radiating transmission line at only one of the first branching location or the second branching location such that there is no more than one continuous electrical connection from the first end to the second end of the transmission line.

6. A radio frequency communication system as defined in claim 5 wherein if a fault develops in the communication system such that either the first or the second communication signals cannot be transmitted through the fault, the first or second branching means redirect the second communication signal away from the fault and all of the amplification means amplify the second communication signals away from the fault.

7. A radio frequency communication system as defined in claim 6 wherein if the fault prevents communication of the first communication signal from the first end to the second end of the transmission line through the transmission line or the branching transmission line, the base transmitter means commences transmitting the first communication signal to the first end and the second end of the transmission line and the base receiver means commences receiving the second communication signal from the first end and the second end of the radiating transmission line.

8. A radio frequency communication system as defined in claim 7 wherein a system signal is continuously transmitted into the first end or the second end of the radiating transmission line and wherein the system signal cannot be transmitted through a fault.

9. A radio frequency communication system as defined in claim 8 wherein the base station comprises alternate base transmitter means for transmitting the first communication signal at the first frequency to the transmission line into the first end or into the second end of the transmission line when the base transmitter means fails and alternate base receiver means for receiving the second communication signal at the second frequency from the first end or the second end of the transmission line when the base receiver fails;

associated with each amplification means is alternative amplification means for amplifying the first and second communication signals when the amplification means with which the alternative amplification means is associated fails; and associated with each branching means is an alternative branching means for electrically coupling the branching radiating transmission line to the radiating transmission line when the branching means with which the alternative branching means is associated fails.

10. A radio frequency communication system as defined in claim 9 further comprising a second remote mobile communication unit having mobile receiver means for receiving communication signals at the first frequency from the transmission line; and wherein when the first communication unit transmits the second communication signal at the second frequency, the base receiver means receives the second communication signal and the base transmitter means retransmits the first communication signal at the first frequency corresponding to the second communication signal such that the second communication signal can be communicated from the first communication unit to the second communication unit.

11. A radio frequency communication system as defined in claim 10 wherein the base station is located above ground and a substantial part of the radiating transmission line is located below ground.

12. A radio frequency communication system as defined in claim 11 wherein the communication system is used to facilitate communication in a mine.

13. A radio frequency communication system as defined in claim 12 wherein the communication signals relate to audio information, video information and computer data.

14. A radio frequency communication system for communicating signals from and to remote mobile communication units comprising:

a radiating transmission line having a first end and a second end;

a first mobile communication unit comprising mobile receiver means for receiving a first communication signal from the transmission line at a first frequency and mobile transmitter means for transmitting a second communication signal to the transmission line at a second frequency;

a base station coupled to the first end of the radiating transmission line comprising:

base transmitter means for transmitting the first communication signal at the first frequency into the first end; and base receiver means for receiving the second communication signal at the second frequency from the first end;

a first branching means located at a branching location on the radiating transmission line for electrically coupling the second end of the radiating transmission line to the radiating transmission line at the branching location such that the first and second communication signals may pass from the radiating transmission line into the second end of the transmission line;

wherein the second end of the radiating transmission line is electrically coupled to the radiating transmission line at the branching location if, and only if, there is a fault in the system between the branching location and the second end of the transmission line.

15. A radio frequency communication system as defined in claim 14 wherein when there is a fault in the transmission line between the branching location and the second end of the transmission line, the first branching means electrically couples the second end to the transmission line such that the first communication signals are transmitted to the fault by the radiating transmission through the branching location to the fault and into the second end of the transmission line to the fault.

16. A radio frequency communication system as defined in claim 14 wherein when there is a fault in the transmission line between the branching location and the second end of the transmission line, the first branching means electrically couples the second end to the transmission line such that the second communication signal passes through the branching location if the first mobile communication unit is located near the transmission line between the fault and the branching location, and the second communication signal passes through the second end of the transmission line, through the branching means and into the radiating transmission line at the branching location in the first mobile communication unit is located near the transmission line between the fault and the second end of the transmission line.

17. A radio frequency communication system for communicating signals from and to remote mobile communication units comprising:

a radiating transmission line having a first end and a second end;

a first remote mobile communication unit comprising mobile receiver means for receiving a first communication signal from the transmission line at a first frequency and mobile transmitter means for transmitting a second communication signal to the transmission line at a second frequency;

a base station coupled to the first end and the second end of the radiating transmission line, said base station comprising:

base transmitter means for transmitting the first communication signal at the first frequency into the first end or into the second end of the transmission line; and base receiver means for receiving the second communication signal at the second frequency from the first end or the second end of the transmission line;

a branching radiating transmission line having a first end and a second end;

a first branching means for electrically coupling the first end of the branching radiating transmission line to the radiating transmission line such that the first and second communication signals may pass from the radiating transmission line to the branching transmission line, said first branching means being connected to the radiating transmission line at a first branching location;

a second branching means for electrically coupling the second end of the branching radiating transmission line to the radiating transmission line such that the first and second communication signals may pass from the radiating transmission line to the branching transmission line, said second branching means connected to the radiating transmission line at a second branching location separated from the first branching location; and wherein the branching radiating transmission line is electrically coupled to the radiating transmission line at only one of the first branching location or the second branching location such that there is no more than one continuous electrical connection from the first end to the second end of the transmission line.

18. A radio frequency communication system as defined in claim 17 wherein if a fault develops in the communication system preventing communication of the first communication signal from the first end to the second end of the transmission line through the transmission line or the branching transmission line, the base transmitter means commences transmitting the first communication signal to the first end and the second end of the transmission line and the base receiver means commences receiving the second communication signal from the first end and the second end of the radiating transmission line.

19. A radio frequency communication system as defined in claim 18 further comprising a plurality of amplification means for amplifying the first and second communication signals wherein each such amplification means is connected to said transmission line at locations;

wherein during normal operation the base transmitter means transmits the first communication signal to the first end of the transmission line and the base receiver means receives the second communication signal from the first end of the communication transmission line and all of the amplification means amplify the second communication signals towards the first end of the radiating transmission line and amplify the first communication signals away from the first end of the radiating transmission line; and wherein if a fault develops in the communication system such that either the first or the second communication signals cannot be transmitted through the fault, the first or second branching means redirect the second communication signal away from the fault and all of the amplification means amplify the second communication signals away from the fault.

20. A radio frequency communication system as defined in claim 19 further comprising:

a second remote mobile communication unit having mobile receiver means for receiving communication signals at the first frequency from the transmission line;

wherein when the first communication unit transmits the second communication signal at the second frequency, the base receiver means receives the second communication signal and the base transmitter means retransmits the first communication signal at the first frequency corresponding to the second communication signal such that the second communication signal can be communicated from the first communication unit to the second communication unit;

wherein a system signal is continuously transmitted into the first end or the second end of the radiating transmission line and wherein the system signal cannot be transmitted through a fault; and wherein the communication system is used to facilitate communication in a mine.

\* \* \* \* \*